Feb. 27, 1923.
H. SURBECK ET AL.
GLARE SHIELD FOR MOTOR VEHICLES.
FILED OCT. 27, 1920.
1,446,946.
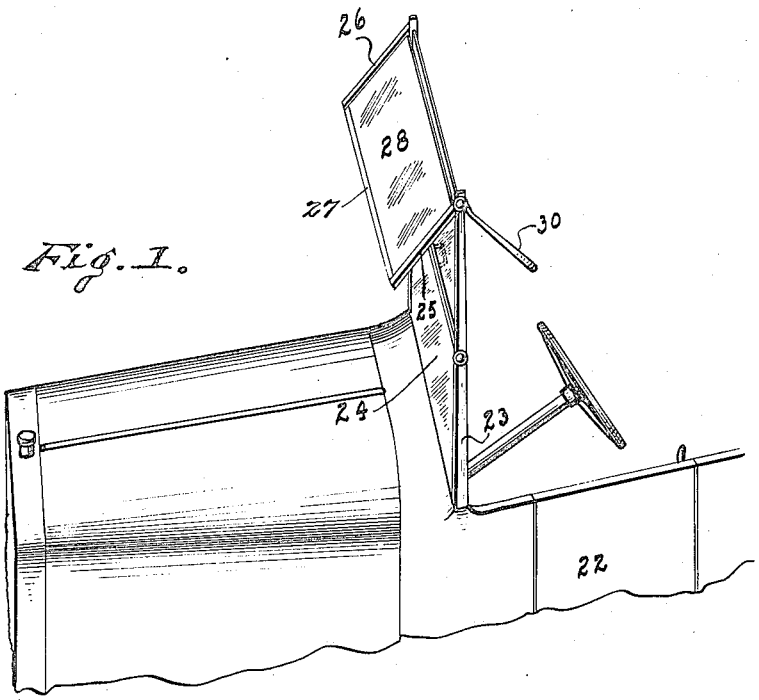
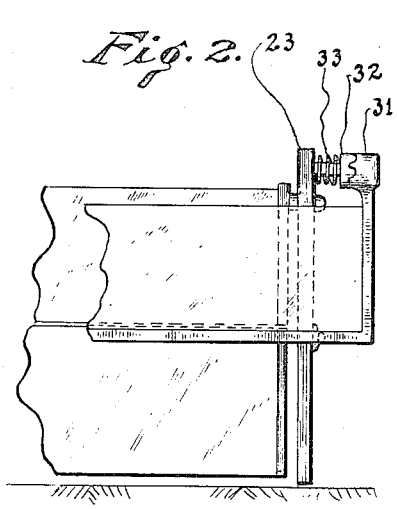
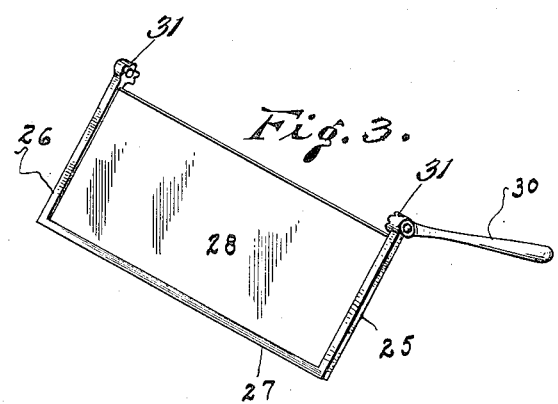
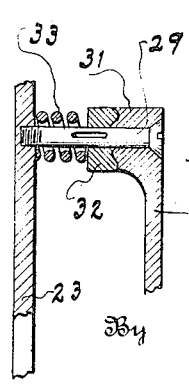
Inventors
H.L. Surbeck &
J.F. Perrin
By Lacey & Lacey, Attorneys Patented Feb. 27, 1923.

1,446,946

UNITED STATES PATENT OFFICE.

HOMER L. SURBECK AND JESSE F. PERRIN, OF RAPID CITY, SOUTH DAKOTA.

GLARE SHIELD FOR MOTOR VEHICLES.

Application filed October 27, 1920. Ser No. 419,954.

*To all whom it may concern:*

Be it known that we, HOMER L. SURBECK and JESSE F. PERRIN, citizens of the United States, residing at Rapid City, in the county of Pennington and State of South Dakota, have invented certain new and useful Improvements in Glare Shields for Motor Vehicles, of which the following is a specification.

This invention relates to an improved glare shield for motor vehicles and has as one of its principal objects to provide a device of this character for protecting the driver of a vehicle from the glare of the headlights of an oncoming vehicle.

A further object of the invention is to provide a device of this character which may be readily attached to an ordinary motor vehicle wind shield and which may be adjustably tilted to suit the convenience of the driver of the vehicle.

A still further object of the invention is to provide a device adapted to protect the vehicle wind shield against rain and snow so that clear vision may always be had through the wind shield.

A further object of the invention is to provide protection against glare of the sun when driving toward the sun late in the afternoon, it being possible to completely lower the device so as to furnish protection from glare of the road or pavement when the glare is especially bright, as in driving when snow is on the ground.

And the invention has as a still further object to provide a device which will be pleasing in appearance and which may be employed in connection with the wind shield of substantially any conventional design of motor vehicle.

Other and incidental objects will appear hereinafter.

In the drawings:

Figure 1 is a fragmentary perspective view showing our improved glare shield attached to the wind shield of a motor vehicle of conventional design, Figure 2 is a fragmentary front elevation showing the device applied, Figure 3 is a detail perspective view of the glare shield, and Figure 4 is a fragmentary sectional view particularly illustrating the mounting of the glare shield.

Referring now more particularly to the drawings, a motor vehicle of conventional design is indicated at 22. Rising from the cowl of the vehicle are the wind shield posts 23 and pivoted between said posts is the wind shield 24.

In carrying the invention into effect, we employ a glare shield frame having end bars 25 and 26 joined at their lower ends by a bottom bar 27. Secured in the frame is a light filtering element 28 of glass or other approved material. Threaded into the posts 23 of the vehicle wind shield near the upper ends of said posts are laterally directed posts 29 which are engaged through the upper ends of the end bars 25 and 26 of the frame for pivotally supporting the glare shield upon the wind shield extending in front thereof. Projecting rearwardly from the upper end of the end bar 25 of the glare shield frame is an angularly disposed lever 30 and formed on the upper ends of both of the end bars 25 and 26 are toothed clutch members 31 projecting at the inner sides of said end bars. Splined upon the posts 29 to coact with the clutch members 31 are clutch members 32 and bearing between the posts 23 of the wind shield and these latter clutch members are springs 33 surrounding the posts 29 and yieldably holding the clutch members 32 against the clutch members 31. Thus, the lever 30 may be manipulated for adjustably tilting the glare shield with respect to the wind shield of the vehicle when the clutch members 32 will engage the clutch members 31 of the end bars 25 and 26 for locking the glare shield in adjusted position. The glare shield may accordingly be arranged to depend in front of the wind shield or may be swung upwardly to a position out of the way. As will be seen, when the glare shield is arranged as shown in Figure 1, the light filtering element 28 will efficiently protect the eyes of the driver against the glare of the headlights of an oncoming vehicle as well as against the glare of the sun. Furthermore, when the glare shield is arranged in this position, the shield will serve to protect the wind shield of the vehicle from snow or rain.

Having thus described the invention, what is claimed as new is:

The combination with a wind shield having side posts, of a glare shield including a one-piece frame having end bars extending at the outer sides of said posts and enlarged at their rear ends to provide clutch members one having a rearwardly directed integral handle extending therefrom, posts extending freely through said members and engaged with said first-mentioned posts swingingly supporting the frame having the handle thereof extending at the rear of the wind shield whereby said handle may be readily grasped for swinging the glare shield, clutch members splined upon the latter post, and springs bearing between the wind shield posts and the latter clutch members urging said members to coact with said first-mentioned clutch members for automatically locking the frame when swung.

In testimony whereof we affix our signatures.

HOMER L. SURBECK. [L. S.]
JESSE F. PERRIN. [L. S.]